Feb. 17, 1959 W. J. SCHIESER ET AL 2,873,478
INJECTION MOLDING MACHINE WITH WEIGH-FEEDER
AND PLUNGER POSITION CONTROL
Filed Feb. 18, 1957 4 Sheets-Sheet 2
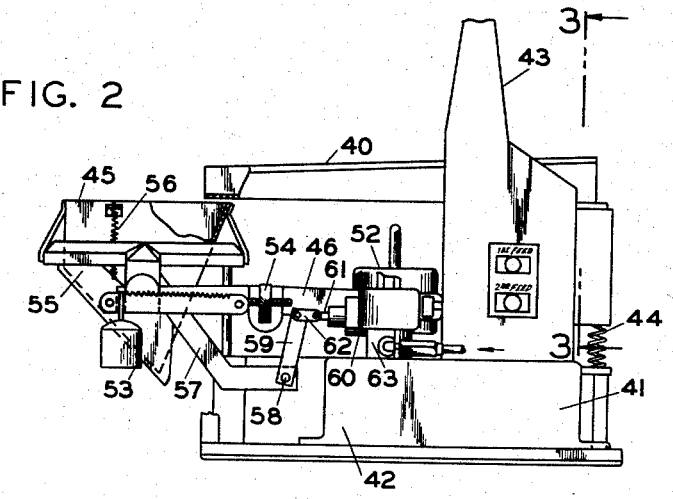
FIG. 2
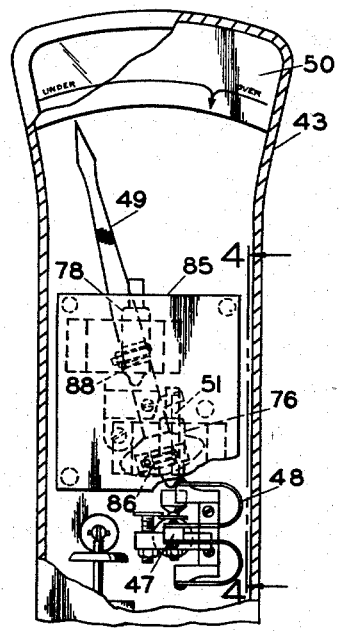
FIG. 3
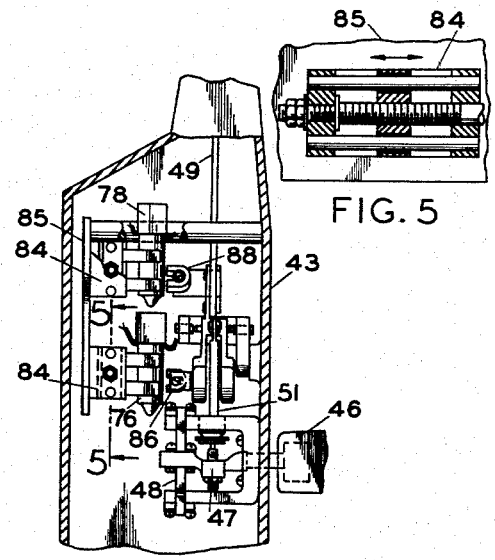
FIG. 4
FIG. 5
INVENTORS
WARREN J. SCHIESER
JOHN F. KELLEY
BY DONALD G. MARSHALL
CORBETT, MAHONEY & MILLER, ATTYS.

Feb. 17, 1959

W. J. SCHIESER ET AL 2,873,478

INJECTION MOLDING MACHINE WITH WEIGH-FEEDER
AND PLUNGER POSITION CONTROL

Filed Feb. 18, 1957

INVENTORS
WARREN J. SCHIESER
JOHN F. KELLEY
DONALD G. MARSHALL
BY
CORBETT, MAHONEY & MILLER, ATTYS.
BY

United States Patent Office 2,873,478
Patented Feb. 17, 1959

2,873,478

INJECTION MOLDING MACHINE WITH WEIGH-FEEDER AND PLUNGER POSITION CONTROL

Warren J. Schieser, John F. Kelley, and Donald G. Marshall, Columbus, Ohio, assignors to National Industrial Products Company, a corporation of Ohio Application February 18, 1957, Serial No. 640,939

2 Claims. (Cl. 18—30)

Our invention relates to an injection molding machine with weigh-feeder and plunger position control. It has to do, more specifically, with an injection molding machine for molding plastic materials which is provided with a weigh-feeder that is automatically controlled by the injection molding apparatus of the machine, the weigh-feeder including a control system for automatically controlling the position of the molding machine plunger.

The practice of weigh-feeding the charge of plastic molding material to an injection molding machine has become widely accepted and several advantages over the previously-used system of volume-measuring the charge are realized. These advantages are outlined in various current scientific papers and in the patents to Schieser et al. Nos. 2,736,922 dated March 6, 1956, and 2,736,923 dated March 6, 1956.

With plastic injection molding machines used at present, generally speaking, the manner of injecting the shot or charge of plastic molding material into the die or mold is by one of two systems which are described as starved-feeding, or cushion-feeding the die or mold.

Starved-feeding may be described as the system in which the exact amount of plastic molding material required to fill the die or mold is fed to the molding machine feed chamber ahead of the ram of the machine. The ram, which is usually operated hydraulically, then forces the shot or charge into the die or mold via the plasticizer or heat chamber. In so doing, the ram operates to the limit of its stroke, the limit being determined by a mechanical stop. A ram operating in this manner is said to be bottoming.

Cushion-feeding differs from starved-feeding in that the ram does not bottom, due to an excess amount of molding material purposely provided ahead of the ram. The excess of molding material cannot be forced into the die or mold and, therefore, serves as a cushion for the ram as it reaches the extent of its injection stroke.

Whether the ram of an injection molding machine is to be starved-fed or cushion-fed, depends upon many things, such as the type of plastic molding material being used, the type of die or mold, the type of press, and the judgment of the molder. It is quite generally agreed that, regardless of whether the die is starved-fed or cushion-fed, weigh-feeding an exact amount of plastic molding material to the feed chamber of the ram for subsequent feeding to the die is desirable, and in many cases essential, in order to maintain control of the ram to keep it bottoming when starved-feeding to the die or to maintain a uniform cushion ahead of the ram when cushion-feeding to the die.

It will be understood that if a charge of plastic molding material is delivered to the ram and is light in weight, this will cause a short shot, that is an unfilled die, or will cause a decreased cushion, depending upon the method of feeding the die. If the quantity of plastic molding material delivered to the ram is heavy in weight, it could prevent the ram from bottoming or increase the cushion to an undesirable extent, depending upon the method of feeding the die. The results of varying the charge of plastic molding material delivered to the ram might cause the above conditions to occur quickly or over a long period of time, depending upon the degree of error in each delivered charge, and other factors described below.

Factors, other than variation in the charge of the plastic molding material delivered to the ram, can cause improper bottoming of the ram or changes in size of the cushion. For example, these may be: variations in hydraulic pressure driving the ram; variations in temperature that would affect the degree of plasticizing of the material supplied to the ram and would alter resistance to flow of the material into the die; variations in the time cycle during which pressure is applied to the ram; and variations in over-all cycle time caused by the operator.

Since the variables described above do exist, there was a need before development of the machines disclosed in said patents for a weigh-feeder in an injection molding machine which not only would weigh each charge and supply it to the ram but which would be automatically adjusted by operation of the ram to compensate for these variables so as to eliminate the undesirable effects on the ram position caused by all of the aforementioned variables. This need was more pronounced in the case of cushion-feeding but was present in the case of starved-feeding. The machines disclosed in said patents served this need but the present invention relates to an improved system whereby the position of the plunger is even more accurately controlled in accordance with the variables mentioned above.

This application is a continuation-in-part of our co-pending application Serial No. 572,990, filed March 21, 1956, now Patent No. 2,822,577.

A preferred embodiment of our invention is illustrated in the accompanying drawings wherein similar characters of reference designate corresponding parts and wherein:

Figure 2 is a side elevational view, partly broken away, of the weigh-feeder having the plunger position control system.

Figure 3 is a vertical sectional view through the indicator tower of the weighing scale of the weigh-feeder along line 3—3 of Figure 2 showing the switches which it controls.

Figure 4 is a vertical sectional view along line 4—4 of Figure 3.

Figure 5 is a vertical sectional view along line 5—5 of Figure 4.

Figures 7 to 10, inclusive, are diagrammatic views illustrating the sequence in operations of the weigh-feeder and plunger position control system.

Figure 1:
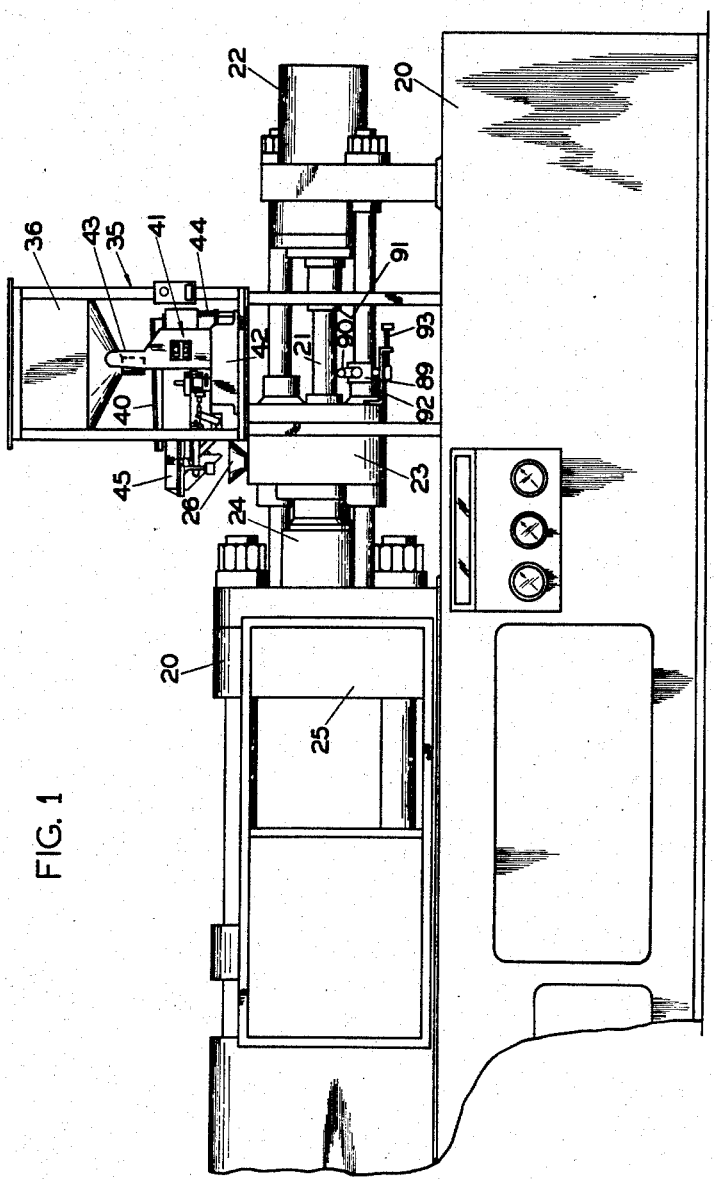
Figure 1 is a side elevational view illustrating an injection molding machine having a weigh-feeder and plunger position control system in accordance with our invention.

With reference to the drawings, in Figure 1 we have illustrated our invention embodied in an injection molding press of the horizontal type but it is to be understood that it could be embodied in a press of the vertical type.

Our invention is not limited to any special make of press but is applicable to any press wherein there is provided a ram structure for injection the molding material into the die or mold.

In the press shown in Figure 1, the press in general is indicated by the numeral 20. This press includes the plunger 21 which is operated by a hydraulic cylinder 22. In the injection or molding operation, the plunger 21 is moved forwardly through a feed section 23 and through a heating or plasticizing section 24, to force the plastic molding material ahead of it into a mold or die section 25. This section 25 will contain in suitable single cavity or set of die cavities into which the plunger 21 will force the plasticized molding charge which has been previously fed to the ram in granular form through an inlet funnel 26 on the feed section 23.

The plunger 21, when projected forwardly, will completely close the inlet slot leading from funnel 26 into section 23 after moving the previously supplied charge of material forwardly into the plasticizing chamber provided in section 24, where it is gradually heated and melted as it passes through this chamber and before it reaches one or more mold cavities in the section 25. When the plunger 21 is retracted rearwardly to the limit of its movement, the forward end of the plunger will be behind the inlet slot and a charge of material, previously dumped into the funnel 26, can then drop in front of the plunger for subsequent forward movement through the feed chamber, the plasticizing chamber, and into the die cavity or cavities. It will be noted that the press 20 is so constructed that a portion of the plunger 21 lying between the cylinder 22 and the feed section 23 of the press is always exposed.

For automatically supplying successive charges of the plastic molding material to the funnel 26, we provide the weigh-feeder 35. This weigh-feeder 35 is supported by a suitable vertical framework which is attached to the frame of the press 20 in such a location that the weigh-feeder will feed successively weighed charges of material into the funnel 26. This weigh-feeder in its general structure is substantially the same as that disclosed in the copending application of Schieser et al., Serial No. 553,596, filed December 16, 1955.

This weigh-feeder receives material from a vibratory feeder 40 which is of the well-known electromagnetically operated type and which, in turn, receives material from a hopper 36. However, it may receive material from any other suitable feeding mechanism. Associated with the feeder 40 is a scale 41. The scale 41 includes the base 42 and an upstanding indicator tower 43 which is disposed at the right-hand end of the base (Figure 2) and the dial of which (not shown) is readable from that end. The vibratory feeder 40 is suitably supported on a base adjacent the scale by means of springs, one of which is shown at 44. The tower 43 is offset forwardly (Figure 2) on the scale base to permit the trough of the feeder 40 to be disposed at a low level so that its discharge end is directly over a weigh bucket 45 which is provided at the end of the scale opposite to that where the tower 43 is disposed.

The scale 41 has fulcrumed on the base thereof a weigh-lever 46 which is shown as being of the one-to-one ratio type but may be of other suitable types. This lever 46 extends behind the indicator tower 43 and has an extension 47 (Figures 3 and 4) which extends forwardly into the indicator tower 43 and which has flexes 48 associated therewith which normally keep the lever in balanced position. An indicator pointer 49 of the pendulum type is provided for swinging movement in the tower in association with an over-and-under weight dial 50 and is connected to the weigh-lever extension 47 by means of a gravity type push rod 51 of the suitable type.

The weigh-bucket 45 is disposed at the commodity end of the weigh-lever 46 directly over the funnel 26. The end of the weigh-lever 46 opposite to the bucket-supporting end has the counterbalance weight outrider 52 pivotally mounted thereon for counterbalancing the weight of the bucket 45 and associated parts. The lever 46 also has adjustably mounted on the front thereof a counterpoise weight 53 and a balancing weight 54.

The bucket 45 is of hopper form (Figures 1 and 2) and has a lower outwardly directed open end. For closing this lower outwardly directed open end of the bucket 45 we provide a gate 55. This gate is trough-shaped and is mounted for vertical swinging movement from closed position, in straddling relationship to the lower portions of the front and rear bucket walls to open position or dumping position where it is swung outwardly away from the bucket walls. The gate 55 is normally held in its uppermost or bucket-closing position by means of a pair of tension springs 56, one of which is shown in Figure 2, which have their lower ends anchored to the gate 55 and their upper ends anchored to the front and rear walls of the bucket.

For opening and closing the gate 55, we provide the operating mechanism shown in Figures 1 and 2, none of which is carried by line elements of the scale and, therefore, the gate-operating mechanism has no deleterious effect on the scale during the weighing operation and does not interfere with the accuracy of such operation. This operating mechanism only engages the gate when it is desired to move it into dumping position.

This operating mechanism comprises a pair of operating arms 57 provided at the front and rear of the bucket 45, one of which is shown in Figure 2, and which are operatively connected to the gate as disclosed in said copending application Serial No. 553,596. The arms 57 project downwardly and laterally of the bucket 45 and have their ends keyed on a rock-shaft 58 (Figure 2) which extends forwardly and rearwardly beneath the weigh-lever 46. This rock-shaft is rocked by means of a rock-arm 59 keyed on the forward end thereof.

The rock-arm 59 is rocked at the proper periods by means of an air-operated cylinder and piston unit 60 (Figures 1 and 2) which is carried on the base 42 of the scale as shown in Figure 1. The piston rod 61 of this unit is connected to the upper end of the rock-arm 59 by means of a link 62. The unit 60 is controlled to open and close the gate 55 by an electromagnetically operated air valve 63 which operates in the manner disclosed in Serial No. 553,596.

With this arrangement of air-operated cylinder and piston unit 60, and air valve 63 for controlling the opening and closing of the gate 55, precise control over the gate is accomplished. Before the valve 63 is operated by a proper supply of electric current thereto, the gate 55 is in closed position. However, as soon as the valve 63 is actuated, the piston rod 61 is moved to the left and the arm 59 is rocked to the left about the axis of the shaft 58. This causes the arms 57 to swing down and swing the gate 55 downwardly against the force of the springs 56, thereby discharging the contents of the bucket 45 which has been previously weighed, and the arms will hold the scale lever down in overweight condition to prevent the feed of material from starting again for a selected period, as will later appear. The air cylinder and piston unit 60 will operate to swing the arms 57 smoothly without shock and the speed of movement of the unit 60 can be adjusted at will by means disclosed in Serial No. 553,596.

Figure 6:
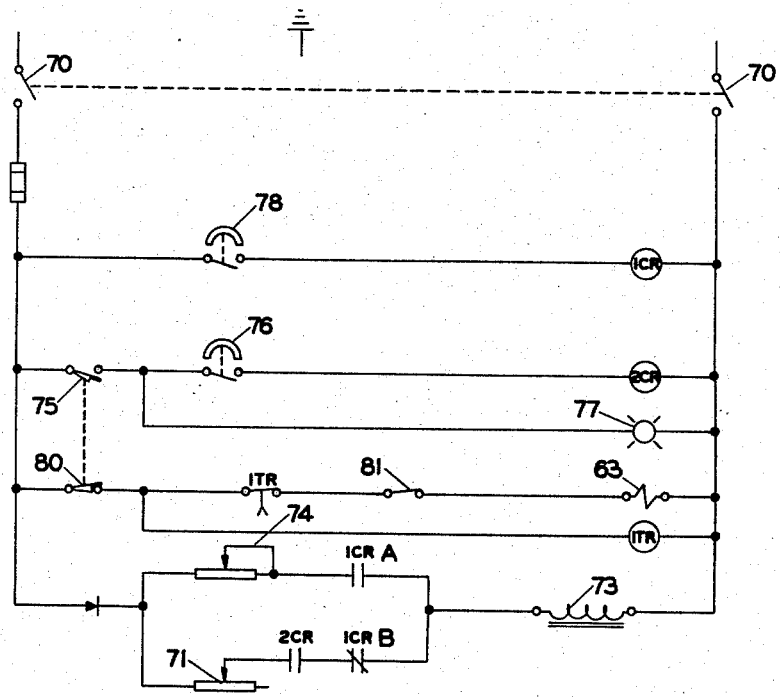
Figure 6 is a circuit diagram of the complete circuit for controlling the weigh-feeder and the plunger position control system.

In Figure 6, we have illustrated a circuit which can be used in controlling a weigh-feeder and associated plunger position control of the type indicated above.

The circuit includes a manual single throw double pole main switch 70 which controls the entire circuit. Included in the circuit is what we terme a first-feed circuit which includes a mercury magnetic switch 78, which is controlled automatically in accordance with the position of the indicator pointer 49 and this switch controls the relay coil 1CR, with which it is connected in the circuit in series and which actuates the set of normally open relay contacts 1CRA associated with the first-feed rheostat 74 which is connected in series in the circuit with the coil 73 of the vibratory feeder 40. The rheostat 74 is preferably mounted readily available for adjustment so that the first-feed circuit can be adjusted easily and quickly by adjustment of the rheostat 74 to vary the rate of feed of material produced by the vibrator coil 73. What we term a second-feed circuit is also connected in the main circuit and includes the plunger switch 75, the mercury magnetic switch 76 and the relay coil 2CR, which are connected in series with each other but in parallel with the first-feed circuit which includes the switch 78. The switch 75 is a limit switch which is operated automatically in accordance with the position of the press plunger 21 and controls the second-feed circuit. The mercury magnetic switch 76 is also operated automatically in accordance with the position of the indicator pointer 49 and controls energizing of the relay coil 2CR which, in turn, controls the set of normally open relay controls 2CR that are associated with an adjustable resistor 71. The resistor 71 is connected in the second-feed circuit so as to control the vibrator coil 73. It is connected in the main circuit parallel with the first-feed rheostat 74 but in series with the normally open relay contacts 2CR, the normally-closed relay contacts 1CRB, and the coil 73. The relay 1CR is so designed that when the contacts 1CRA thereof are open the contacts 1CRB thereof are closed and vice versa. The resistor 71 can be adjusted to adjust the second-feed circuit so as to vary the rate of feed produced by the vibrator coil 73. However, it will not be desirable to adjust the feed produced by the second-feed circuit frequently so it is desirable that the adjustable rheostat be located where it is not too readily accessible. The limit switch 75 also controls the plunger position indicator light 77, with which it is connected in series, this light circuit being in parallel with the second-feed circuit. A dump switch 80 controls the circuit for the air valve 63 and is actuated automatically by the plunger 21 of the press, being normally closed with the plunger position control switch 75 in its normally open position, it being noted that these switches are mechanically connected together for operation as a unit. The dump switch circuit is connected in the main circuit in parallel with the two feed circuits and includes the switch 80, the normally closed contacts 1TR of a time-delay relay, and the manual dump switch 81 which are all connected in series. The time-delay relay which controls the air valve 63 also includes the relay coil 1TR which is connected in the circuit in parallel with the valve 63 but in series with the switch 80 and controls the relay contacts 1TR which open at the end of a time-delay interval after the coil 1TR is energized. The manual dump switch 81 can be actuated at any time for opening the dump circuit. The magnetic switches 76 and 78 are open when the indicator pointer 49 is at prescribed weight and are closed when it is in an underweight position.

The switches 76 and 78 are disposed in the indicator tower 43, each being carried by a screw arrangement 84, one of which is shown in detail in Figure 5, for adjustment transversely of the tower, the screws being supported by a supporting plate 85 supported by the tower. Adjusting knobs are provided outside the tower as shown in Figures 1 and 2. Carried on the indicator pointer 49 are the two magnets 86 and 88 which cooperate with the respective lower and upper switches 76 and 78. These switches 76 and 78 are of the mercury magnetic type and are under the control of the respective magnets 86 and 88. The first-feed switch 78 is closed in the underweight position of the indicator 49 shown in Figure 3 and the second-feed switch is also closed in the underweight position of the indicator. The switches may be adjusted transversely of the indicator tower 43 to vary the instant when the switches are actuated in accordance with the swinging of the indicator pointer 49.

The dump switch 80 and the limit switch 75 are disposed in the same housing 89 which is associated with the ram 21 as shown in Figure 1. This combined switch is actuated by a trip lever 90 which is normally held in its rearwardmost position but which is engaged by a shoulder 91 on the plunger when the plunger moves forwardly sufficiently. Initial forward swinging of the lever 90 will open the dump switch 80 and continued forward movement of the lever will close the plunger position control limit switch 75. The housing 89 of the switch is mounted on a guide bracket 92 which is attached to the press section 23 and is adjustable on the bracket longitudinally of the press by means of the screw 93.

In setting up the machine for cushion feeding, the switch housing 89 is adjusted by the screw 93 to an exact predetermined position so that the plunger position control switch 75 carried therein, will close when the desired cushion is obtained in front of the plunger 21. The light 77 will aid in making this set-up since the circuit to it will be completed when the switch 75 is closed. With the machine set up in this manner and with the main switch 70 is closed, the entire system will function in the following manner.

Figure 7:
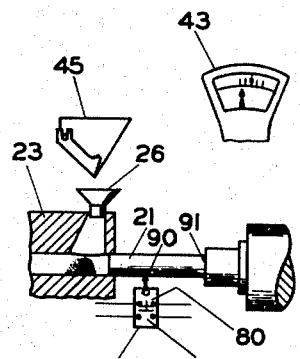
Figure 8:
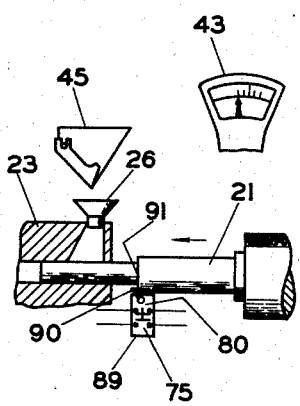

Assuming the plunger 21 to be retracted and the scale 41 to be unbalanced with the indicator pointer 49 in underweight position, the second-feed and first-feed switches 76 and 78 will be closed, the plunger position control switch 75 will be open, the dump switch 80 will be closed, the time-delay relay contacts 1TR will be open and the manual dump switch 81 will be closed, and the set of relay contacts 2CR will be open but since the relay coil 1CR is energized, the set of relay contacts 1CRA, which it controls, will be closed while the set of relay contacts 1CRB, which it controls, will be opened. Thus, at this time, the first-feed circuit will energize the coil of the vibratory feeder 73 through the rheostat 74 but the second-feed circuit through the resistor 71 will be dead. A predetermined amount of material is thereby fed to the weigh bucket 45 under the control of the first-feed circuit. This first-feed will continue until the indicator pointer 49 approaches a predetermined underweight position, as shown in Figures 7 and 8 and as determined by the adjustment of the position of the switch 78 relative to the pointer 49, when the switch 78 will be opened and this first-feed circuit will be deenergized. The plunger 21 now advances, as indicated in Figure 9, forcing plastic material previously supplied by the weigh-feeder 40, into the mold. If the plunger advances far enough to close the limit switch 75, the second-feed circuit will be actuated since the relay coil 2CR will be energized and will close the relay contacts 2CR and the relay contacts 1CRB will be closed due to deenergizing of the coil 1CR again completing the circuit to the vibrator coil 73 but through the resistor 71 of the second-feed circuit and not through the resistor 74 of the first-feed circuit since the first-feed circuit will be dead. There will be no danger of feed through both the first and second feed circuits simultaneously since the relay contacts 1CRA of the first-feed circuit are open when the relay contacts 1CRB of the second-feed circuit are closed and vice versa. Thus, the second-feed circuit will always accurately supply a predetermined amount of additional material to the bucket 45 until the cut-off point of the switch 76 is reached, which is determined by the positioning of such switch relative to the pointer 49, and the second-feed circuit cannot possibly add to this feed. The switch 76 should be positioned so that the cut-off point is overweight as indicated in Figure 9 for cushion feed. When this method is used, material will never be delivered to the press in charges of exact weight for the part being formed but will always be over or underweight. This method insures that the plunger must travel to about the same position each stroke. If the plunger 21 starts to move toward bottom, the weight of the successive charge is increased and the cushion size is increased; however, if the cushion size tends to increase the weight of the successive charge is decreased and again the plunger 21 moves toward bottom. The variation in plunger position from one cycle to the next depends on the actual weight of material added by the second feed. The cut-off switches 76 and 78 should be set to cut off at the same relative positions, underweight and overweight, as indicated by a comparison of Figures 8 and 9.

A specific example of a scale setting is as follows:

If a part that weighs 12 oz. is being molded by the press and it is decided that ½ oz. of weight variation will take care of any variations in the molding press, the scale would be set to cut off on the first feed at 11¾ oz. The second feed would add ½ oz. and make the total weight 12¼ oz. With the feeder set as described above, the first-feed would cut off at ¼ oz. underweight and the second-feed would cut off at ¼ oz. overweight. The amount of weight variation that would be used to hold a cushion must be determined by the job being run. The variation must be enough to take in any weight variation that can be expected in the part being molded. However, the smaller the weight variation used, the more uniform the plunger position will be, and the more uniform the press cycle will be.

Figure 10:
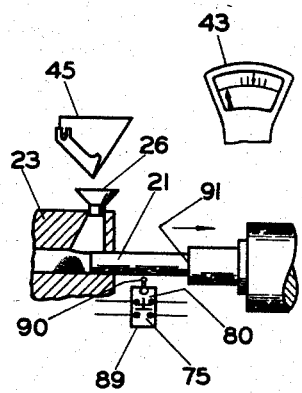

As the plunger 21 reaches its forwardmost position, as indicated in Figure 9, the dump circuit is still open. As the plunger moves back, as indicated in Figure 10, the contacts of dump switch 80 return to their normally closed position. This energizes the time-delay relay coil 1TR which opens the relay contacts 1TR after the timer times out, so that the gate 55 is held open for a given amount of time and then closes, keeping the scale lever in overweight position, as previously indicated, and thereby delaying starting of the feed for a selected period. The indicator pointer 49 swings underweight when the dump circuit is deenergized and allows the switch 78 to close and the first-feed circuit to again energize the feeder coil 73.

Figure 9A:
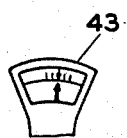
Figure 9:
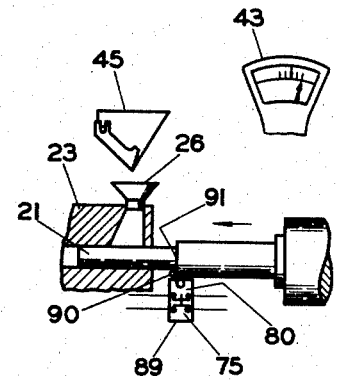

For starved feedings, the cut-off point for the second-feed is set at exact weight position of the pointer 49 as shown in Figure 9a. As the plunger 21 moves into its bottom position the second-feed circuit is broken since the pointer 49 will be at exact weight. The other sequence of operations is the same as in cushion feeding except the plunger always bottoms and the cut-off of the second-feed is always when the pointer is at exact weight. If a cushion tends to build up, the additional feed circuit will not operate to thereby decrease the amount of the next charge so that the plunger will bottom.

Thus, the weigh-feeder 35 will supply successive weighed charges to the press. The position of the plunger 21 will be controlled so that the proper cushion is maintained or the plunger bottoms. The plunger position system will be precise and will make possible the feeding of an exact amount of plastic required for a particular article being molded. Both the first-feed and the second-feed can be adjusted accurately and independently of each other but, as indicated before, the adjustment of the first-feed should be made more convenient than the second since the additional feed of material need not be varied as frequently but under a certain set of operating conditions is set and remains set. The first and second feeds are completely independent and there is no danger of the accuracy of the second-feed being interfered with by the first-feed, since we have provided means for insuring that the first-feed circuit is dead during operation of the second-feed circuit. Vibration of the press sometimes shakes the feeder 40, after the first-feed, so that additional material is supplied to the bucket. However, since the first-feed is set to cut-off underweight, this will not produce an inaccuracy in the charge because the second-feed will merely bring the charge up to the required amount. The second-feed occurs during the smooth part of the operating cycle of the press, that is, during injection, and will not be affected by vibration, and the bucket will be dumped immediately after the completion of the second-feed before any possibility of any additional material being accidentally added. The machine is not only more accurate but is easier to set up because the additional feed is based on actual weight and not a time period as in the machines of said patents.

Various other advantages will be apparent.

Having thus described our invention, what we claim is:

1. An injection molding machine having a plunger movable between injecting and non-injecting positions, a weigh-feeder for weighing and supplying charges to the plunger, said weigh-feeder including weighing mechanism and electrically operated material-feeding mechanism for feeding material thereto, electrically operated first-control means comprising a first-feed switch actuated by said weighing mechanism for controlling said material-feeding mechanism for causing said weigh-feeder to feed an underweight charge of material to the plunger, means in said first-control means adjustable to vary the size of the underweight charge fed by said feeding mechanism, electrically operated second control means actuated by the plunger for causing said weigh-feeder to feed an additional amount of material when needed to a successive charge in accordance with the injecting position of said plunger to thereby control the position of the plunger in a successive injecting operation, said second control means including a limit switch actuated by said plunger when it moves to a predetermined position in its injecting stroke to start the additional feed and a cut-off switch actuated by said weighing mechanism when it reaches required weight position to interrupt said additional feed, and means in said second control means adjustable to vary said additional amount of material fed by said feeding mechanism.

2. An injection molding machine having a plunger movable between injecting and non-injecting positions, a weigh-feeder for weighing and supplying charges to the plunger, said weigh-feeder including weighing mechanism and electrically operated material-feeding mechanism for feeding material thereto, electrically operated first-control means comprising a first-feed switch actuated by said weighing mechanism for controlling said material-feeding mechanism for causing said weigh-feeder to feed an underweight charge of material to the plunger, electrically operated second control means actuated by the plunger for causing said weigh-feeder to feed an additional amount of material when needed to a successive charge in accordance with the injecting position of said plunger to thereby control the position of the plunger in a successive injecting operation, said second control means including a limit switch actuated by said plunger when it moves to a predetermined position in its injecting stroke to start the additional feed and a cut-off switch actuated by said weighing mechanism when it reaches required weight position to interrupt said additional feed, said material-feeding means including a vibrator coil, said first-control means including a first-feed electric circuit connected to said coil, said second-control means including a second-feed circuit connected to said coil but being in parallel with the first-feed circuit, said first-feed circuit including a first relay coil which is energized and deenergized under control of said first-feed switch and said second-feed circuit including a second relay coil which is energized and deenergized under control of said limit switch and said cut-off switch, said first relay coil controlling a first set of relay contacts which make and break the first feed circuit to the vibrator coil and a second set of contacts which make and break the second-feed circuit to the vibrator coil, one of said sets of relay contacts being closed to make its respective circuit while the other set is open to break its respective circuit and vice versa, and said second relay coil controlling an independent set of relay contacts which make and break the second-feed circuit.

References Cited in the file of this patent

UNITED STATES PATENTS

| | | |
|---|---|---|
| 2,760,232 | Rougemont et al. | Aug. 28, 1956 |
| 2,822,577 | Schieser et al. | Feb. 11, 1958 |